United States Patent
Stanley et al.

(10) Patent No.: US 10,725,171 B2
(45) Date of Patent: Jul. 28, 2020

(54) METHOD AND SYSTEM FOR LOCALIZATION OF A VEHICLE USING SURFACE PENETRATING RADAR

(71) Applicant: Massachusetts Institute of Technology, Cambridge, MA (US)

(72) Inventors: Byron McCall Stanley, Newton, MA (US); Matthew Tyler Cornick, San Diego, CA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 224 days.

(21) Appl. No.: 15/830,398

(22) Filed: Dec. 4, 2017

(65) Prior Publication Data
US 2018/0217251 A1 Aug. 2, 2018

Related U.S. Application Data

(60) Provisional application No. 62/529,740, filed on Jul. 7, 2017, provisional application No. 62/451,313, filed on Jan. 27, 2017.

(51) Int. Cl.
*G01S 13/88* (2006.01)
*G01S 7/41* (2006.01)
(Continued)

(52) U.S. Cl.
CPC .......... *G01S 13/885* (2013.01); *B60W 40/06* (2013.01); *G01S 7/411* (2013.01); *G01S 13/87* (2013.01);
(Continued)

(58) Field of Classification Search
CPC ...... G01S 13/89; G01S 13/885; G01S 13/865; G01S 13/867; G01S 13/87; G01S 13/872;
(Continued)

(56) References Cited

U.S. PATENT DOCUMENTS 3,366,960 A 1/1968 Gluck
4,162,509 A 7/1979 Robertson
(Continued)

FOREIGN PATENT DOCUMENTS

JP 09053939 A 2/1997
JP 2001289651 A 10/2001
(Continued)

OTHER PUBLICATIONS

International Search Report & Written Opinion in International Patent Application No. PCT/US17/64458, dated Feb. 5, 2018; 7 pages.
(Continued)

*Primary Examiner* — Olumide Ajibade Akonai
(74) *Attorney, Agent, or Firm* — Schmeiser, Olsen & Watts LLP; William G. Guerin

(57) ABSTRACT

A method and a surface penetrating radar (SPR) system for localization of a vehicle are disclosed. The method includes transmitting a radar signal having a first frequency into a subsurface region adjacent to a vehicle. A first set of SPR images of a first subsurface volume within the subsurface region is acquired and location data for the vehicle are determined from the first set of SPR images. A second radar signal having a frequency that is greater than the first frequency is transmitted into the subsurface region and a second set of SPR images of a second subsurface volume within the subsurface region is acquired. The second subsurface volume at least partially overlaps the first subsurface volume. Location data are determined from the second set of SPR images at a greater resolution than the location data determined from the first set of SPR images.

23 Claims, 8 Drawing Sheets

(51) Int. Cl.

| | |
|---|---|
| B60W 40/06 | (2012.01) |
| G01S 13/87 | (2006.01) |
| G01S 13/95 | (2006.01) |
| G01S 13/89 | (2006.01) |
| G01S 13/86 | (2006.01) |
| G01C 21/36 | (2006.01) |
| G01S 13/931 | (2020.01) |
| G01C 21/26 | (2006.01) |

(52) U.S. Cl.
CPC ............ *G01S 13/872* (2013.01); *G01S 13/89* (2013.01); *G01S 13/951* (2013.01); *B60W 2552/00* (2020.02); *G01C 21/26* (2013.01); *G01C 21/3602* (2013.01); *G01S 13/862* (2013.01); *G01S 13/865* (2013.01); *G01S 13/867* (2013.01); *G01S 2013/9327* (2020.01)

(58) Field of Classification Search
CPC .............. G01S 13/951; G01S 7/411; G01S 2013/9371; G01S 2013/9327; G01S 13/931; G01S 7/03; G01S 13/887; G01S 13/888; G01S 15/89; G01S 13/106; G01C 21/26; G01C 21/30; B60W 2550/14; B60W 40/06; B60W 2420/52; B60W 40/068; H01Q 15/14

See application file for complete search history.

(56) References Cited

U.S. PATENT DOCUMENTS

| | | | |
|---|---|---|---|
| 4,495,589 | A | 1/1985 | Hirzel |
| 4,671,650 | A | 6/1987 | Hirzel et al. |
| 5,202,692 | A | 4/1993 | Huguenin et al. |
| 5,485,384 | A | 1/1996 | Falconnet |
| 6,005,511 | A | 12/1999 | Young et al. |
| 6,082,466 | A | 7/2000 | Gudat |
| 6,362,775 | B1 | 3/2002 | Goebel et al. |
| 6,370,475 | B1 | 4/2002 | Breed et al. |
| 6,453,223 | B1 | 9/2002 | Kelly et al. |
| 6,766,253 | B2 | 7/2004 | Burns et al. |
| 7,191,056 | B2 | 3/2007 | Costello et al. |
| 7,395,156 | B2 | 7/2008 | Chiou et al. |
| 8,207,834 | B2 | 6/2012 | Takemura et al. |
| 8,207,885 | B2 | 6/2012 | Hibbard et al. |
| 8,306,747 | B1 | 11/2012 | Gagarin et al. |
| 8,457,814 | B2 | 6/2013 | Hasegawa |
| 8,730,084 | B2 * | 5/2014 | Al-Khalefah ............ G01S 7/03 342/22 |
| 8,786,485 | B2 | 7/2014 | Atkins et al. |
| 8,849,523 | B1 * | 9/2014 | Chan ................. G01S 13/89 701/50 |
| 8,949,024 | B2 | 2/2015 | Stanley et al. |
| 8,994,581 | B1 | 3/2015 | Brown |
| 2002/0122000 | A1 | 9/2002 | Bradley et al. |
| 2003/0090406 | A1 * | 5/2003 | Longstaff ............ G01S 13/0209 342/22 |
| 2004/0032363 | A1 | 2/2004 | Schantz et al. |
| 2006/0044177 | A1 | 3/2006 | Wittenberg et al. |
| 2006/0095172 | A1 | 5/2006 | Abramovitch et al. |
| 2008/0143585 | A1 | 6/2008 | Thomas et al. |
| 2009/0051593 | A1 | 2/2009 | Wiesbeck et al. |
| 2010/0002655 | A1 | 1/2010 | Ofuji et al. |
| 2010/0052971 | A1 | 3/2010 | Amarillas |
| 2010/0066585 | A1 | 3/2010 | Hibbard et al. |
| 2010/0085175 | A1 | 4/2010 | Fridthjof |
| 2010/0189498 | A1 | 7/2010 | Doherty et al. |
| 2010/0259438 | A1 * | 10/2010 | Jones ................. G01C 15/00 342/22 |
| 2011/0025546 | A1 | 2/2011 | Cook et al. |
| 2012/0026329 | A1 | 2/2012 | Vorobiev |
| 2012/0271540 | A1 | 10/2012 | Miksa et al. |
| 2013/0018575 | A1 | 1/2013 | Birken et al. |
| 2013/0050008 | A1 * | 2/2013 | Atkins ................. G01S 13/89 342/22 |
| 2013/0113648 | A1 * | 5/2013 | Duvoisin, III ........ G01S 13/887 342/22 |
| 2014/0022117 | A1 * | 1/2014 | Cist ......................... G01S 7/04 342/176 |
| 2014/0081507 | A1 | 3/2014 | Urmson et al. |
| 2014/0121964 | A1 | 5/2014 | Stanley et al. |
| 2014/0125509 | A1 | 5/2014 | Stolarczyk et al. |
| 2014/0159938 | A1 * | 6/2014 | Shipley .................... G01V 3/12 342/22 |
| 2015/0268218 | A1 | 9/2015 | Troxler |
| 2016/0097879 | A1 | 4/2016 | Stolarczyk et al. |
| 2017/0184717 | A1 * | 6/2017 | Feigin .................. G01S 13/885 |
| 2018/0114305 | A1 | 4/2018 | Strnad et al. |

FOREIGN PATENT DOCUMENTS

| | | |
|---|---|---|
| KR | 20060087449 A | 8/2006 |
| WO | 2005098471 A2 | 10/2005 |
| WO | 2012167069 A1 | 12/2012 |

OTHER PUBLICATIONS

California Partners for Advanced Transit and Highways, "California PATH Magnetic Guidance System", University of California, Berkeley, Institute of Transportation Studies, Richmond, CA; 2 pages.

Levinson, Jesse and Sebastian Thrun, "Robust Vehicle Localization in Urban Environments Using Probabilistic Maps", 2010 IEEE International Conference on Robotics and Automation, May 3-8, 2010, Anchorage, Alaska; 7 pages.

Hahnel, et al., "An Efficient FastSLAM Algorithm for Generating Maps of Large-Scale Cyclic Environments from Raw Laser Range Measurements", 2003 IEEE/RSJ International Conference on Intelligent Robots and Systems, Proceedings, pp. 206-211, vol. 1; 6 pages.

International Search Report & Written Opinion in international application No. PCT/US13130682, dated Dec. 16, 2013; 11 pages.

Non-Final Office Action in U.S. Appl. No. 13/798,416, dated May 28, 2014; 14 pages.

Non-Final Office Action in U.S. Appl. No. 13/798,416, dated Sep. 17, 2014; 9 pages.

Notice of Allowance in U.S. Appl. No. 13/798,416, dated Nov. 17, 2014; 5 pages.

Ryan, Dorothy, "Lincoln Laboratory Demonstrates Highly Accurate Vehicle Localization Under Adverse Weather Conditions", www.ll.mit.edu/news/Highly-accurate-vehicle-localization-under-adverse-weather.html, 3 pages, Jun. 2016.

Fenn, et al., Ultrawideband Cavity-Backed Resistively Loaded Planar Dipole Array for Ground Penetrating Radar, IEEE International Symposium on Phased Array, Waltham, MA, pp. 117-123, 2013.

Cornick, et al., "Localizing Ground Penetrating Radar: A Step Toward Robust Autonomous Ground Vehicle Localization", 2015, Journal of Field Robotics, vol. 33, pp. 82-102, 2016.

International Search Report & Written Opinion in international application No. PCT/US18/15791, dated May 10, 2018; 9 pages.

International Search Report & Written Opinion for international application No. PCT/US18/15775, dated Apr. 13, 2018.

Website for "Enabling Autonomous Vehicles to Drive in the Snow with Localizing Ground Penetrating Radar." MIT Lincoln Laboratory. Jun. 24, 2016. https://www.youtube.com/watch?v=rZq5FMwl8D4.

Stanley, Bryon M. "Localizing Ground-Penetrating Radar." MIT Lincoln Laboratory. Jun. 13, 2017. 30 pages.

"Commercial Vehicle On-Board Safety Systems Rountable" International Transport Forum, Jan. 5-6, 2017. http://www.itf-oecd.org/managing-transition-driverless-road-freight-transport.

"Managing the Transition to Driverless Road Freight Transport." International Transport Forum, May 31, 2017. https://www.itf-oecd.org/managing-transition-driverless-road-freight-transport.

Stanley, Bryon M. "Localizing Ground-Penetrating Radar Deep Dive." MIT Lincoln Laboratory. Jul. 12, 2017, 44 pages.

(56) References Cited

OTHER PUBLICATIONS

"Data-Led Governance of Road Freight Transport." International Transport Forum, May 31, 2017. https://www.itf-pecd.org/data-led-governance-road-freight-transport.
International Search Report & Written Opinion in international application No. PCT/US13/30682, dated Dec. 16, 2013; 11 pages.
Cornick, et al., "Localizing Ground Penetrating RADAR: A Step Toward Robust Autonomous Ground Vehicle Localization", Journal of Field Robotics, vol. 33, pp. 82-102, 2016.
Notice of Allowance in U.S. Appl. No. 15/882,986 dated Jan. 17, 2020; 10 pages.
International Preliminary Report on Patentability in PCT/US2017/064458 dated Oct. 31, 2019; 6 pages.
International Preliminary Report on Patentability in PCT/US2018/015791 dated Aug. 8, 2019; 8 pages.
International Preliminary Report on Patentability in PCT/US2018/015775 dated Aug. 8, 2019; 8 pages.
Busuioc, et al. "Novel, Low-Cost Millimeter-wave System for Road Surface Characterization," Proceedings of SPIE vol. 7983, 2011.
Non-Final Office Action in U.S. Appl. No. 15/882,889, dated Nov. 18, 2019; 14 pages.
Notice of Allowance in U.S. Appl. No. 15/882,889 dated Apr. 16, 2020; 8 pages.

\* cited by examiner

METHOD AND SYSTEM FOR LOCALIZATION OF A VEHICLE USING SURFACE PENETRATING RADAR

RELATED APPLICATIONS

This application claims the benefit of the earlier filing date of U.S. Provisional Patent Application No. 62/451,313, filed Jan. 27, 2017 and titled "LGPR Capability," and U.S. Provisional Patent Application No. 62/529,740, filed Jul. 7, 2017 and titled "Localizing Ground-Penetrating Radar," the entireties of which are incorporated herein by reference.

GOVERNMENT RIGHTS IN THE INVENTION

This invention was made with government support under Contract No. FA8721-05-C-0002 awarded by the U.S. Air Force. The government has certain rights in the invention.

FIELD OF THE INVENTION

The present invention relates generally to a method and a system for localization of a vehicle using surface penetrating radar. The method and system may be used for navigation of the vehicle.

BACKGROUND OF THE INVENTION

Approaches to autonomous navigation in structured environments, such as road networks, can generally be divided into two categories. In the first category, the autonomous vehicle navigates like a human, with little pre-existing knowledge of the road features beyond simple maps and general rules of the road. The second category of approaches relies on extensive prior knowledge of the environment, for example, a dense set of global positioning system (GPS) measurements marking the lane boundaries and a map of all stop signs, pedestrian crossings and the like. The first category presents a challenging approach due to the extreme variability of real-world environments. The second category approach has been evaluated, for example, by the Defense Advanced Research Project Agency (DARPA) Urban Challenge and the Google self-driving car project. Results have demonstrated that the "rich map" approach to reliable autonomous navigation in structured, well-characterized terrain may be achievable; however, one of the substantial challenges to relying on a detailed prior map is that the system must maintain precise, accurate knowledge of the vehicle location within the map.

Traditionally, GPS receivers have been used to provide global localization; however, GPS alone does not provide the precision necessary to stay within a lane of traffic. Furthermore, GPS accuracy degrades severely in environments with multipath or shadowing and the signals can easily be blocked or intentionally disrupted by others desiring to interfere with operation. GPS-based systems can be improved with differential signal algorithms or by augmenting the location estimate with inertial sensors; however, the resulting systems are typically costly and may require additional infrastructure such as base stations.

To overcome these limitations, some autonomous vehicles sense the local environment and register the sensor measurements to a map of prior observations. The success of this map-matching approach depends significantly upon the type of sensor and the locale. Passive visual methods, for example, methods employing one or more digital video cameras, can perform poorly in outdoor environments due to changes in scene illumination. Variations in solar illumination angle and cloudiness may result in a system seeing a substantially different scene than the scene sensed during prior map observations. Active visual sensing (such as LIDAR) is another approach and is among the techniques used by autonomous vehicles such as the Google self-driving car. Rather than relying on natural or uncontrolled illumination, the sensor transmits light, typically at frequencies that are otherwise relatively dark, and measures the intensity of the return. Algorithms are used to search for similar intensity patterns in a map of previous measurements to determine the location of the vehicle. While the active sensing approach solves the problem of inconsistent scene illumination, difficulties are encountered when the apparent scene changes significantly with weather conditions. Snow, for example, obscures important features required to match a scene to prior acquired scenes. Other weather conditions such as fog, rain and dust also impact performance. Moreover, dynamic aspects of the observed scene can create further complications. For example, the presence of other moving vehicles and the motion of typically static features due to wind gusts present significant challenges. Automotive radar is also used, though primarily for obstacle avoidance. It does not have the angular or range resolution currently to serve as a primary method of localization. Thus, current sensing approaches for map-based localization are not robust to common real-world conditions. Furthermore, active sensors such as those employing light detection and ranging (LIDAR) sensors generally require expensive precision-engineered electro-optical-mechanical systems.

SUMMARY

Exemplary embodiments of the present technology include a method for localization of a vehicle and a surface penetrating radar (SPR) system.

In some embodiments of the method, a first radar signal having a first frequency is transmitted into a subsurface region under a vehicle. A second radar signal having a second frequency is transmitted into the subsurface region, where the second frequency is greater than the first frequency. The method further includes acquiring a first set of SPR images of a first subsurface region based on the first radar signal and acquiring a second set of SPR images of a second subsurface region at least partially overlapping the first subsurface region based on the second radar signal. Location data for the vehicle are determined based on the first set of SPR images and, in another step, location data for the vehicle are determined based on the second set of SPR images.

In some embodiments, the step of determining location data for the vehicle based on the first set of SPR images generates location data at a first resolution and the step of determining location data for the vehicle based on the second set of SPR images is further based on the location data at the first resolution and generates location data at a second resolution. The second resolution is higher than the first resolution.

In some embodiments, the method may further include controlling the movement of the vehicle in response to the location data.

In some embodiments, the acquisition of the first and second sets of SPR images includes applying a range gate to a first received radar signal and a second received radar signal, respectively, from the subsurface region.

In some embodiments, at least one of the first and second sets of SPR images includes SPR images that are weighted according to depth. In other embodiments, at least one of the first and second sets of SPR images includes SPR images having depths that are excluded.

The first radar signal may have a first plurality of frequencies and the second radar signal may have a second plurality of frequencies. The first and second pluralities of frequencies may include overlap frequencies. The second plurality of frequencies may include all the frequencies of the first plurality of frequencies. The first plurality of frequencies includes all the frequencies of the second plurality of frequencies. The first radar signal and/or the second radar signal may include a ramp of discrete frequencies over time. The first radar signal and the second radar signal may be transmitted simultaneously. The first radar signal and the second radar signal may be a single radar signal that includes the first and second frequencies. The first and second radar signals may be transmitted from a same radar transmitter element or different radar transmitter elements. At least one of the first frequency and the second frequency may be selected based on a property of one or more features in the subsurface region.

In some embodiments, a depth of the second subsurface region is smaller than a depth of the first subsurface region.

In one embodiment, the method further includes transmitting into the subsurface region at least one additional radar signal each having a frequency content that is different from the first radar signal, the second radar signal, and each of the other additional radar signals. An additional set of SPR images is acquired for each of the additional radar signals and location data are determined for the vehicle based on the additional sets of SPR images.

In another embodiment, the method further includes transmitting one or more intermediate radar signals into the subsurface region. Each of the intermediate radar signals has an intermediate frequency that is greater than the first frequency and less than the second frequency, and each of the intermediate frequencies is different from each of the other intermediate frequencies. An intermediate set of SPR images of an intermediate subsurface region is acquired for each of the intermediate radar signals and, for each intermediate set of SPR images, location data are determined for the vehicle based on a corresponding one of the intermediate sets of SPR images.

In some embodiments of the SPR system, the system includes an SPR antenna array, a radar processor and a registration module. The SPR antenna array includes a plurality of antenna elements and is configured to transmit a first radar signal having a first frequency and a second radar signal having a second frequency into a subsurface region adjacent to a vehicle. The second frequency is greater than the first frequency and the antenna elements further configured to receive a return radar signal from the subsurface region. The radar processor is in communication with the SPR antenna array and is configured to acquire a first set of SPR images of a first subsurface region based on the first radar signal and to acquire a second set of SPR images of a second subsurface region at least partially overlapping the first subsurface region based on the second radar signal. The registration module is in communication with the processor and is configured to determine location data for the vehicle based on the first set of SPR images and to determine location data for the vehicle based on the second set of SPR images.

The SPR antenna array may be further configured to transmit into the subsurface region at least one additional radar signal each having a frequency content that is different from the first radar signal, the second radar signal, and each of the other additional radar signals and the radar processor further configured to acquire an additional set of SPR images for each of the additional radar signals. The registration module may be further configured to determine location data for the vehicle based on the additional sets of SPR images and location data previously determined for the vehicle.

The SPR antenna array may be further configured to transmit one or more intermediate radar signals into the subsurface region with each of the intermediate radar signals having an intermediate frequency that is greater than the first frequency, less than the second frequency, and different from each of the other intermediate frequencies. The radar processor may be further configured, for each of the intermediate radar signals, to acquire an intermediate set of SPR images of an intermediate subsurface region. The registration module may be further configured, foe each of the intermediate set of SPR images, to determine location data for the vehicle based on a corresponding one of the intermediate sets of SPR images and location data previously determined for the vehicle.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1A:
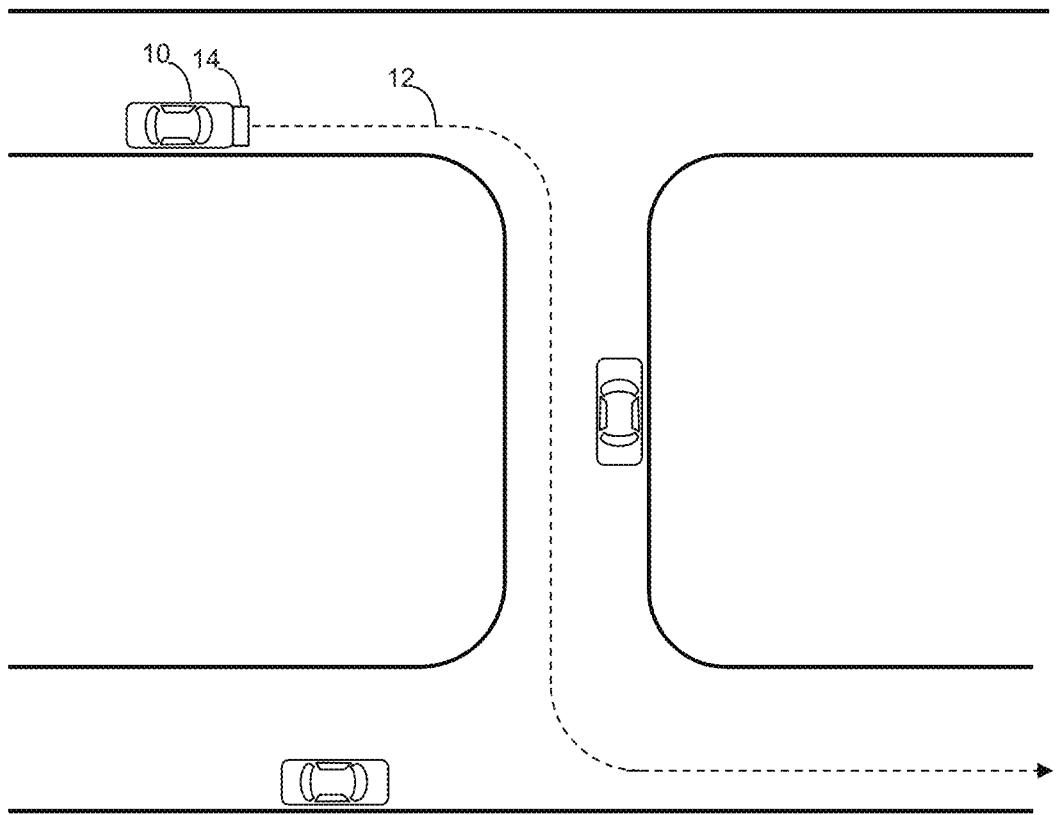
FIG. 1A illustrates a vehicle traveling within a road network according to a predetermined trip path.

Reference is made in various embodiments described below to ground and to an underground region below the surface of the ground. It will be understood that the ground includes soil, road surface or pavement such as asphalt and concrete layers, gravel, sand and the like, and that the surface of the ground is the interface of the ground with the air, array, fluid or free space. In some instances, the surface may also include the surfaces that surround a tunnel, mineshaft and other passageways through which a vehicle may travel.

More generally, reference is made herein to surface penetrating radar (SPR) and ground penetrating radar (GPR). As used herein, SPR means any radar system that is configured to acquired data from a subsurface region. A SPR can be configured and oriented to obtain data for a subsurface region that is behind the surface of a wall, ceiling, floor or one or more surfaces along a tunnel or passageway. In some instances, the SPR can also obtain data for the surface. It will be recognized that a GPR system is a type of SPR system which is configured to acquire data from a region below the surface of the ground and may also acquire data for the surface of the ground. A subsurface region, as used herein, means a region behind the surface such as an underground region behind the ground surface. Alternatively, the subsurface region can be a region behind a surface of a structure, such as a region inside and/or behind a wall or ceiling structure.

In brief overview, the present disclosure relates to a method and a system for localization of a vehicle. The method includes transmitting a radar signal having a first frequency from a SPR system into a subsurface region under or adjacent to a vehicle. A first set of SPR images of a first subsurface volume within the subsurface region is acquired and location data for the vehicle are determined from the first set of SPR images. A second radar signal having a frequency that is greater than the first frequency is transmitted from the SPR system into the subsurface region and a second set of SPR images of a second subsurface volume within the subsurface region is acquired. The second subsurface volume at least partially overlaps the first subsurface volume. Location data are determined from the second set of SPR images. Generally, the location data determined from the second set of SPR images are at a greater resolution than the location data determined from the first set of SPR images due to the higher frequency used to acquire the second set of SPR images.

Determining location data for each set of SPR images may include comparing the acquired SPR images to SPR images previously acquired for a subsurface region that at least partially overlaps the subsurface region along the vehicle track as described, for example, in U.S. Pat. No. 8,949,024, titled "Vehicle Localization Using Surface Penetrating Radar," the disclosure of which is incorporated herein by reference in its entirety. The previously acquired SPR images can be used as a subsurface map to aid in vehicle navigation. Maps can be created with different accuracies and subsurface depths. Lower accuracy maps are used for coarse localization tracking during a vehicle pass over the mapped subsurface region. For example, a lower accuracy map can be used with the first set of SPR images to obtain lower accuracy location data and higher accuracy maps can then be used in conjunction with the coarse location data to obtain fine location data from the second set of SPR images. The coarse localization aids in reducing the search volume for the fine localization and in increasing the robustness and accuracy of the final determined location data. In addition, the use of multiple registration matches obtained for each vehicle position based on the multiple maps further aids in improving robustness and accuracy. In some situations, a subset of significant feature sets within a map can be extracted to allow rapid global localization of the vehicle as a coarse localization using the techniques described in U.S. Pat. No. 8,949,024. The reduced processing set is used to rapidly "relocate" the vehicle in a global reference. This technique is beneficial in GPS-denied environments, such as when the vehicle loses track and has no accurate global estimate of position.

Although described below primarily for autonomous ground vehicle navigation, the method is useful for all applications in which high accuracy vehicle localization data is desired. Moreover, the vehicle is not limited to automobiles and other forms of surface vehicles traveling on land, but instead may be a vehicle capable of navigation on water, underwater, underground, indoors, or by flight.

FIG. 1A depicts a vehicle 10 traveling within a road network according to a predefined trip path (dotted line) 12. The trip path 12 represents the desired route of the vehicle 10 in space and optionally in time. Predefined path segments may be combined to define the trip path 12. The portion of the trip 12 shown in FIG. 1A includes a right turn followed by a left turn. Though the trip path 12 is shown within a conventional road network, it should be appreciated that a trip path is not limited to established pathways such as streets, roads, highways and the like, and in some instances the trip path may be across open terrain.

Although depicted as an automobile, the vehicle 10 can be any mobile platform or structure, including by way of non-limiting examples, platforms for transporting passengers or payloads such as equipment, sensors and other objects. The vehicle 10 has the capability to change direction (i.e., steer), accelerate and decelerate. Although the vehicle 10 in the illustration is generally understood to be non-holonomic as its controllable degrees of freedom are less than the total degrees of freedom, a holonomic vehicle, such as a vehicle with omnidirectional wheels, is also contemplated. In other embodiments, the vehicle 10 is capable of changing one or more of its altitude (or distance from the surface of the ground), pitch, yaw and roll. The vehicle 10 includes a GPR-based navigation system and is operated in an autonomous mode, that is, passenger operation of the vehicle 10 is limited or absent, and there are no remote commands received by the vehicle 10 for navigation. By way of an example, limited operation may include control of the speed by a passenger while other operations remain under autonomous control.

Figure 1B:
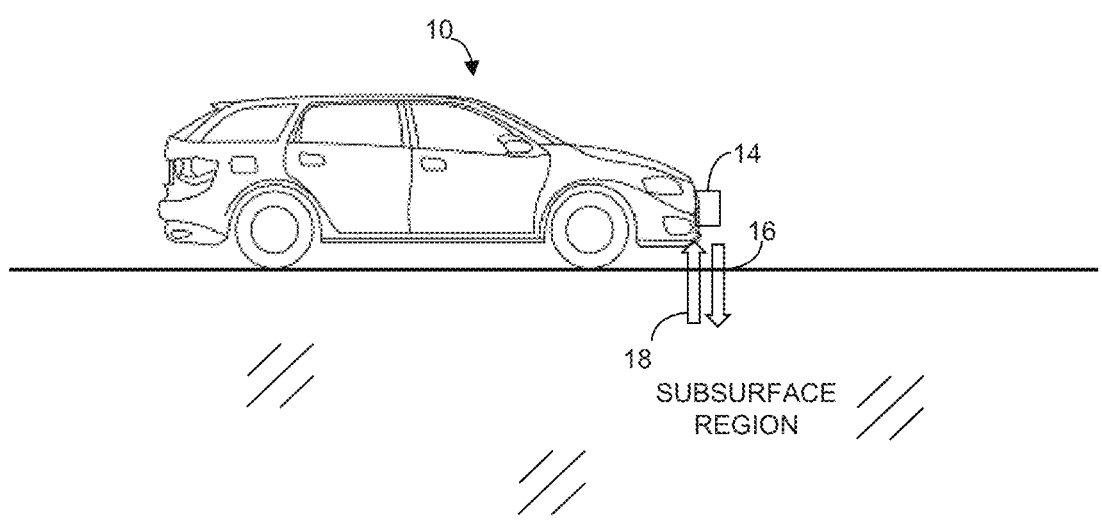
FIG. 1B shows a side view of the vehicle of FIG. 1A.

FIG. 1B shows a side view of the vehicle 10. The navigation system includes a GPR antenna array 14 fixed to the front of the vehicle. In the illustrated embodiment, the GPR antenna array 14 includes a linear configuration of spatially-invariant transmit and receive antenna elements for transmitting radar signals. In other embodiments, the GPR antenna array 14 may be located elsewhere on the vehicle 12 and the transmit and receive antenna elements are not required to be linearly arranged. The linear array 14 is nominally parallel to the ground surface and extends perpendicular to the direction of travel. In alternative configurations the GPR antenna array 14 may be closer to or in contact with the surface of the ground or road. GPR signals 16 propagate downward from the transmitting antenna elements through the road surface in front of the vehicle and into the subsurface region. GPR signals 18 backscattered in an upward direction are detected by the receiving antenna elements.

Figure 2:
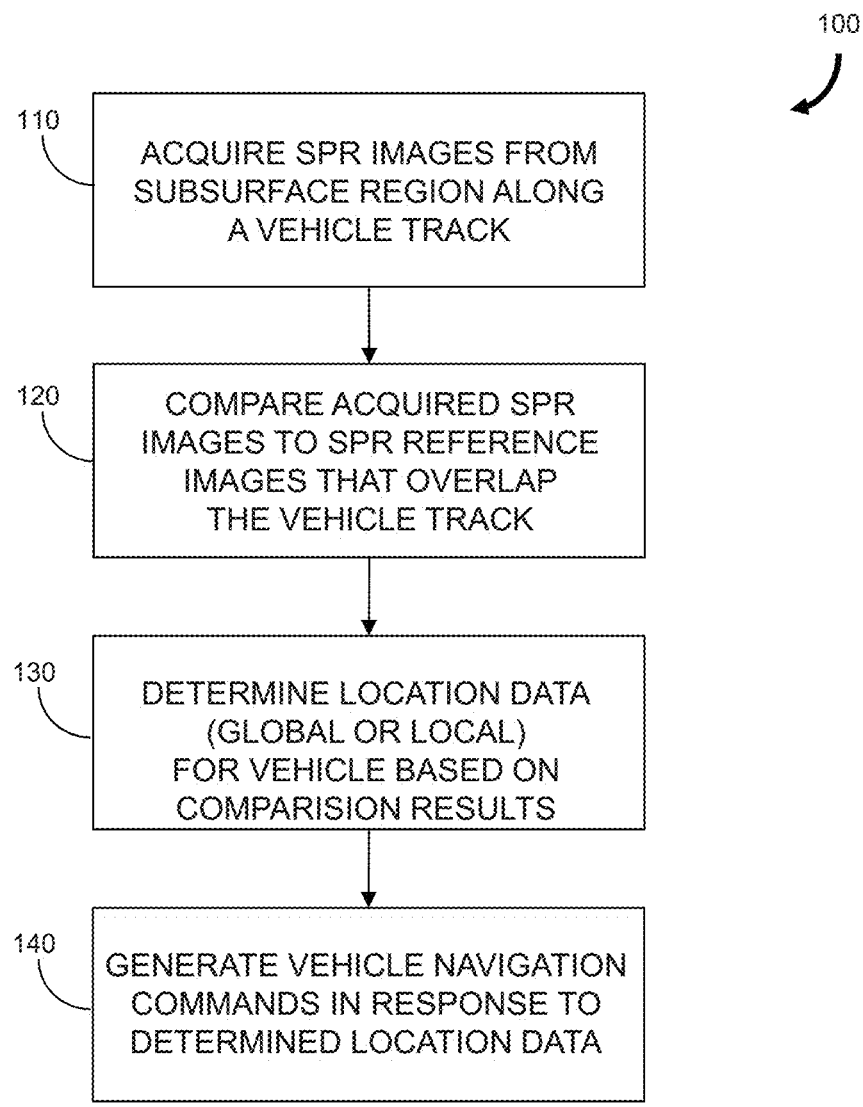
FIG. 2 is a flowchart representation of an embodiment of a method for localization of a vehicle in accordance with the invention.

Referring also to FIG. 2, a flowchart of a method 100 for localization of a vehicle in accordance with an embodiment of the invention is shown. The method 100 includes acquiring (step 110) SPR images (e.g., GPR images) from a subsurface region along the track of the vehicle 10. The SPR images are compared (step 120) to SPR reference images that were previously acquired and stored for subsurface regions that at least partially overlap the subsurface regions for the defined trip path 12. It should be noted that the SPR system for the vehicle that is used to acquire images of the subsurface region along the vehicle track need not be the same as the SPR system used to obtain the SPR reference images that were previously acquired, stored and used in the comparison. For example, the SPR antenna array and other components of the vehicle SPR system may be substantially less expensive and have different performance characteristics compared to a SPR system employed to acquire the SPR reference images. Moreover, the track of the SPR system may differ from the vehicle track during operation, for example, due to the particular location of the SPR system as mounted or attached to the vehicle 10. Thus, it should be understood that the SPR images acquired along a vehicle track can be offset accordingly.

In some embodiments the SPR images also include surface data, i.e., data for the interface of the subsurface region with air or the local environment. If the SPR antenna array is not in contact with the surface, the strongest return signal received is typically based on the reflection caused by the surface. In some instances, the variation in surface topography can benefit the comparison performed in step 120.

The location of the vehicle 10 is determined (step 130) based on the comparison. The location data may be either global or local (e.g., data relative to a prior track of a vehicle). Optionally, the vehicle location data are used to generate (step 140) vehicle navigation commands. More specifically, the velocity, acceleration, orientation, angular velocity and angular acceleration of the vehicle may be continuously controlled via the vehicle navigation commands to maintain the vehicle 10 at the desired position along the trip path 12. In some embodiments, the location data for the vehicle are used in combination with data provided by one or more other sensor or navigation systems to guide the vehicle 10. Such sensor and navigation systems include, by way of examples, an inertial navigation system (INS), a GPS, a sound navigation and ranging (SONAR) system, a LIDAR system, a camera, an inertial measurement unit (IMU) and an auxiliary radar system.

Figure 3:
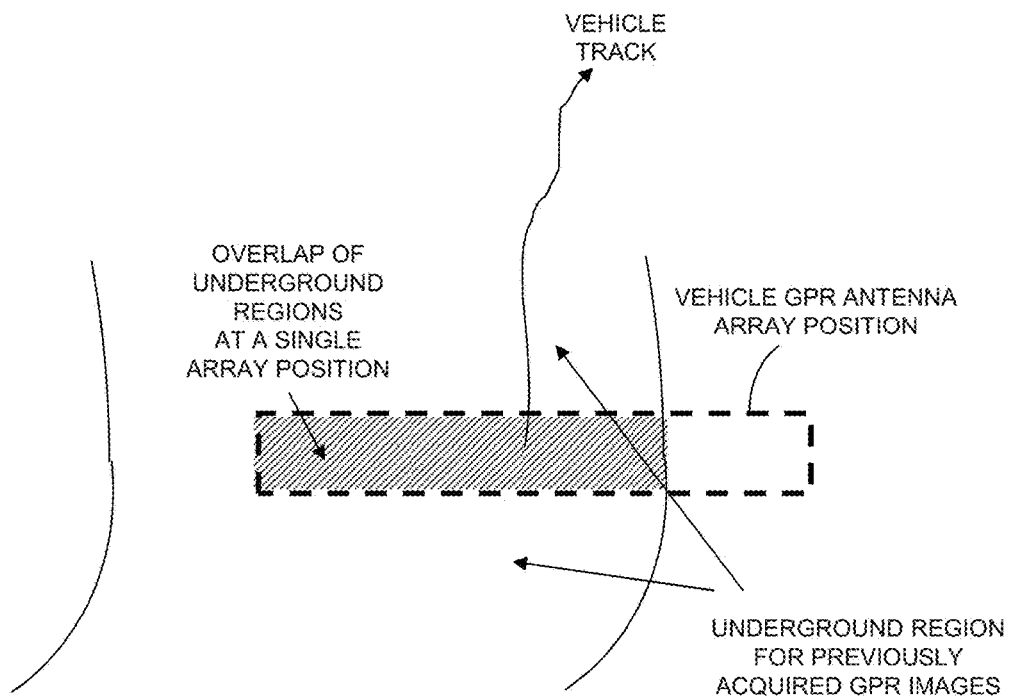
FIG. 3 graphically depicts the movement of a GPR antenna array along a vehicle track relative to an underground region for which previously acquired GPR image data are available.

FIG. 3 depicts the movement of the GPR antenna array along a vehicle track relative to a subsurface (underground) region for which GPR reference images exist. The shaded region indicates the partial overlap of the subsurface region for the GPR reference images and the subsurface region for newly acquired GPR images for the vehicle for one position of the vehicle GPR antenna array. As illustrated, the subsurface region for the GPR reference images corresponds to a curved track of a reference vehicle that acquired the reference images although it should be recognized that reference GPR images can be acquired using multiple measurement paths and combined for greater geographical coverage. Due to the limited accuracy of GPS data, the track traversed by the vehicle typically deviates from the selected trip path as defined according to GPS coordinate data. Commands generated by an autonomous vehicle navigation system, described in more detail below, are used to affect a vehicle path change to reduce or minimize the differences between the vehicle track and the selected trip path. In addition, the speed of the vehicle can be modified along segments of the trip path to maintain safe operation, to accommodate speed limits and to achieve a desired completion time for traversing the trip path.

Figure 4:
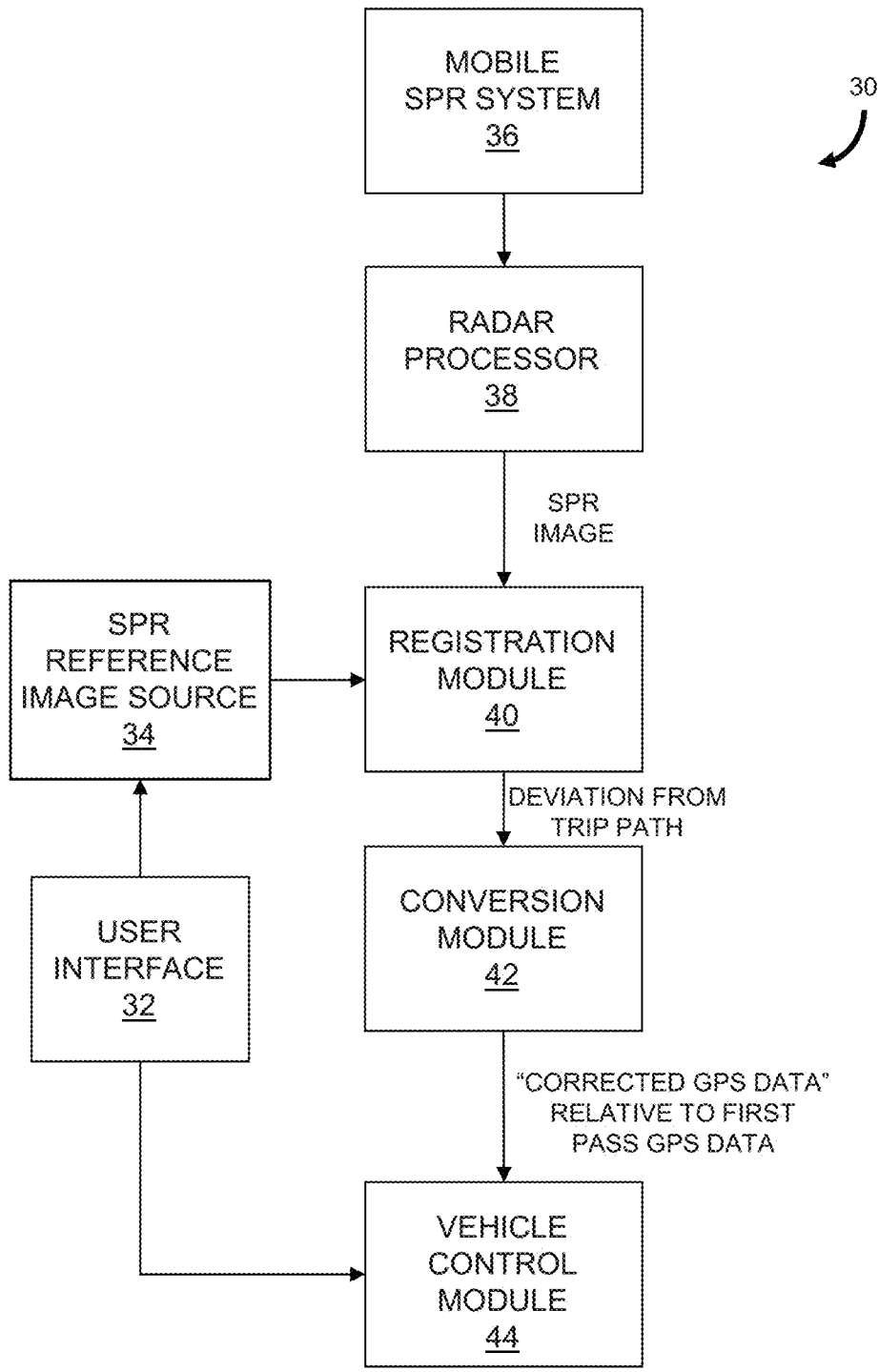
FIG. 4 is a block diagram of an embodiment of a navigation system used for autonomous or semi-autonomous operation of a vehicle according to the invention.

FIG. 4 is a block diagram of an embodiment of a navigation system 30 that can be used to operate a vehicle autonomously, such as according to the method 100 of FIG. 2. The navigation system 30 includes a user interface 32 through which a user can enter data to define the trip path or select a predefined trip path. In some embodiments the user interface 32 is part of a navigation module that displays inquiries to a user and accepts input describing where the user wants to go and what route to follow. SPR images are retrieved from a SPR reference image source 34 according to the trip path. In some embodiments the SPR image data are automatically retrieved based on the current location regardless of the selected trip path. The SPR reference image source 34 can be local or remote to the system 30. Alternatively, a combination of local and remote sources is used. The mobile navigation system also includes a mobile SPR system 36 having a SPR antenna array. The transmit operation of the mobile SPR system 36 is controlled by a radar processor 38 which also receives the return radar signals provided by the SPR antenna array. In some embodiments, the data for the return radar signals are weighted according to depth to compensate for range losses, such as attenuation, so that all the data are adjusted to the same scale with a uniform amplitude distribution as a function of depth. Alternatively, the data may be weighted so that certain depths are emphasized or excluded. For example, depths with stable subsurface features may be emphasized by weighting to prioritize longevity of the reference data. Similarly, emphasis by weighting may be used for shallow depths to prioritize resolution of the data. The radar processor 38 generates SPR images of the subsurface region below and including the road surface underneath the SPR antenna array.

Figure 5:
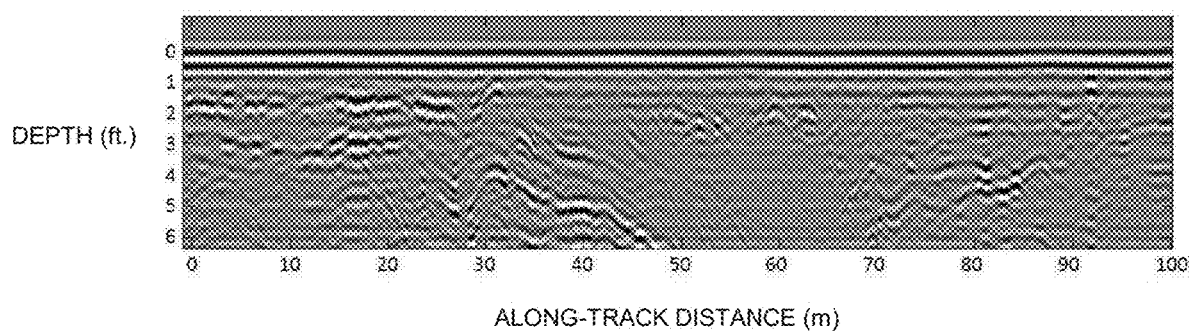
FIG. 5 shows an example of a slice of a surface penetrating radar (SPR) image acquired during travel along a segment of a vehicle track.

FIG. 5 shows an example of a slice of a SPR image acquired during travel along a segment of the vehicle track. The horizontal axis indicates distance along the vehicle track and the vertical axis indicates depth below the ground surface. The underground region depicted in the image corresponds to a single antenna channel and has a cross-track resolution determined according to the spacing of the antenna elements. SPR voltage data are represented in the figure according to a gray scale. The SPR image includes features representative of structure and objects within the subsurface region, such as rocks, roots, boulders, pipes, voids and soil layering, and other features indicative of variations in the soil or material properties in the subsurface region.

Referring back to FIG. 4, SPR images acquired for the vehicle are spatially registered to the previously acquired SPR images that overlap the trip path. In various embodiments, offset data, or positional error data, determined in the registration process are provided to a conversion module 42 which generates GPS data corrected for the vehicle. The corrected GPS data are provided to a vehicle control module 44 so that steering, orientation, velocity, pose and acceleration/deceleration are controlled in a manner to maintain the vehicle along the desired trip path. For example, the vehicle control module may include or cooperate with electrical, mechanical and pneumatic devices in the vehicle to achieve steering and speed control. In other embodiments having various types of propulsion and control mechanisms, a vehicle control module may also include or cooperate with one or more hydraulic, turbine, propeller, control surface, shape changing, and chemical systems or devices. To return to the desired trip path, the vehicle may be controlled to avoid rapid or abrupt correction, and instead to traverse a path to gradually return to the desire trip path at a point further ahead.

The trip path described above can be defined to match path segments that are identical to those used by one or more "reference vehicles" used to acquire the SPR images retrieved from the SPR reference image source 34; however, this is not a general requirement. The method allows global localization data to be determined when there is sufficient overlap in the SPR images for the vehicle's subsurface region with previously obtained SPR reference images. Thus, the trip path is not restricted to reference vehicle paths associated with previously obtained SPR image data. Moreover, if the SPR images obtained by the reference vehicles are globally referenced, data obtained in the registration process can be used to generate a global estimate of the position and pose of the vehicle. Consequently, the global estimate can be used to follow any global path defined by a user as long as the global path at least partially overlaps SPR reference images along the full global path.

As described above, previously acquired SPR reference images can be combined, or stitched, to provide more reference image data than that which can be acquired for a single pass of a mobile SPR system. For example, GPR reference image data for a multi-lane highway can be acquired by multiple passes of a mobile GPR system with each pass corresponding to a single lane of the highway. The GPR reference images for the lanes can be seamlessly combined to provide image data for the full width of the highway. Thus, a vehicle's navigation system can use the reference images for traveling in any lane and for transitioning between adjacent lanes. Alternatively, only a portion of the width of the highway (e.g., a central lane) may be represented in the stored GPR reference images as long as sufficient overlap exists between the subsurface region of a vehicle and the subsurface region represented in the stored GPR reference images for the highway. The trip path for the vehicle can be defined by a global path without particular reference to the path of the reference vehicles used to obtain the SPR reference images. Alternatively, it may be possible to define a trip path using a lane adjacent to the central lane by maintaining a desired lateral offset between the actual vehicle track and a path associated with the GPR reference images. Any further data collected by vehicles (even while tracking a path) may be used to update the reference image data.

Figure 6:
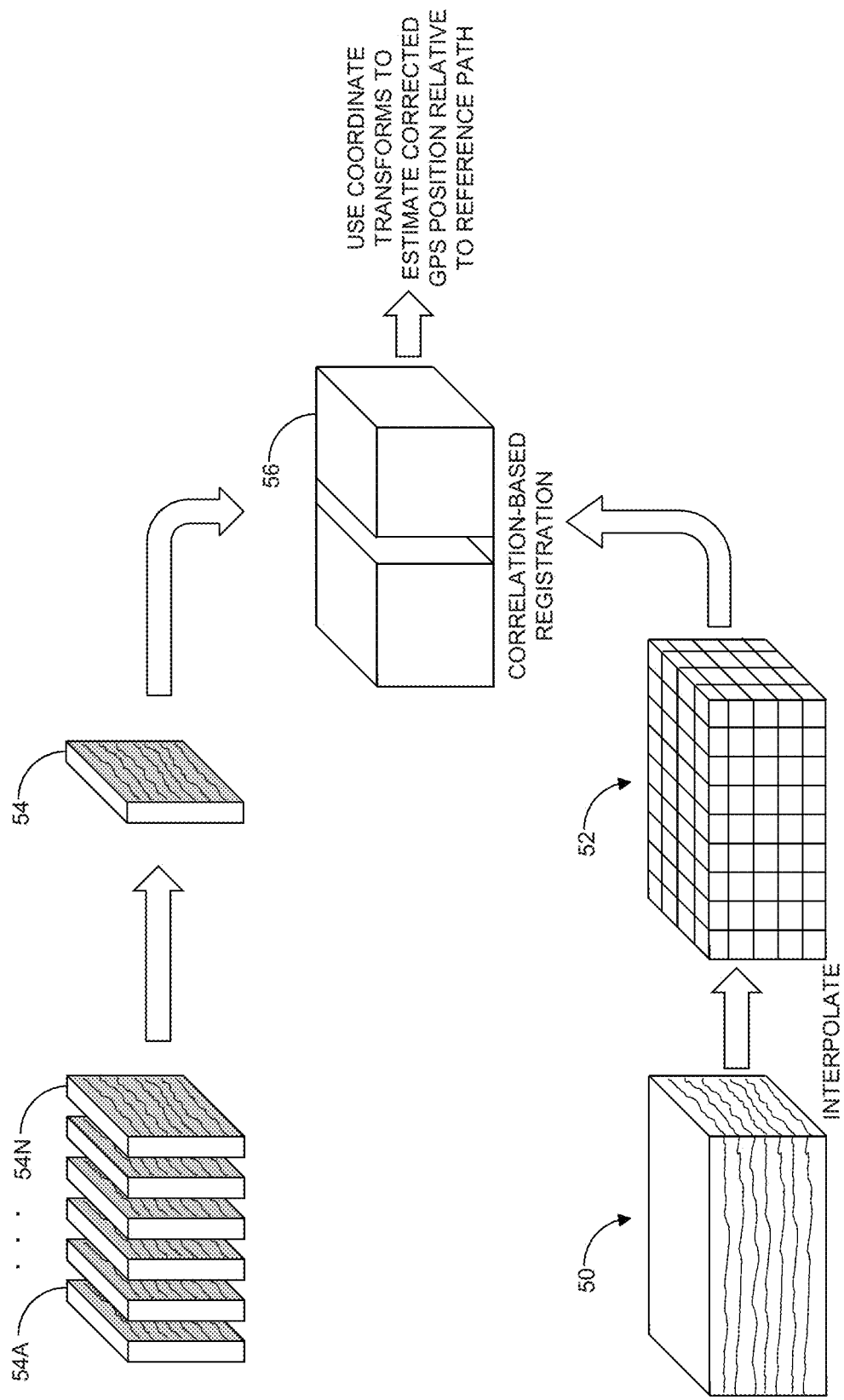
FIG. 6 is a schematic illustration depicting in more detail the processing performed by the radar processor and registration module of FIG. 4.

FIG. 6 is a schematic illustration depicting in more detail the processing performed by the radar processor 38 and the registration module 40 of FIG. 4. Previously obtained SPR image data 50 for the trip path are retrieved and interpolated onto a three-dimensional grid 52. Cross-track SPR image slices 54A to 54N (generally 54) corresponding to multiple array scans are shown with each image slice 54 corresponding a single SPR antenna array scan at a unique position along the vehicle track. A correlation-based registration procedure 56 is applied in latitude, longitude, height, roll and yaw to register the vehicle array scans 54 to the SPR image data 52 interpolated onto the grid. In some embodiments the interpolation occurs in real time prior to registration; however, in other embodiments the interpolation can be performed well in advance of the use of the interpolated data. The location of the SPR antenna array is determined by registering the position of the current data in the previously obtained subsurface map and calculating the resulting corrected local or global position.

The correlation-based registration procedure 56 can be performed using data acquired from a single scan of the SPR antenna array. In alternative embodiments, multiple scans are used for registration to enable a more robust position estimate. For example, data acquired over a period of several seconds can be correlated to multiple scans of previously obtained image data for a larger portion of the subsurface region.

In an alternative to the use of three-dimensional voltage maps for data representation and correlation maximization as the matching technique, a feature-based method may be used. In this alternative method, the three-dimensional voltage data are transformed into a set of feature points in the data that have been identified based ono possible objects, such as rocks, manhole covers, traffic light sensors, or roots, which have particular feature parameters, such as location, frequency response, and orientation. Once a feature set is established, the matching technique can use a distance metric to find the closest match to the feature set to determine location. This alternative technique is similar to the use of scale-invariant feature transform (SIFT) and speed up robust feature (SURF) feature detection techniques used in image processing.

Figure 7:
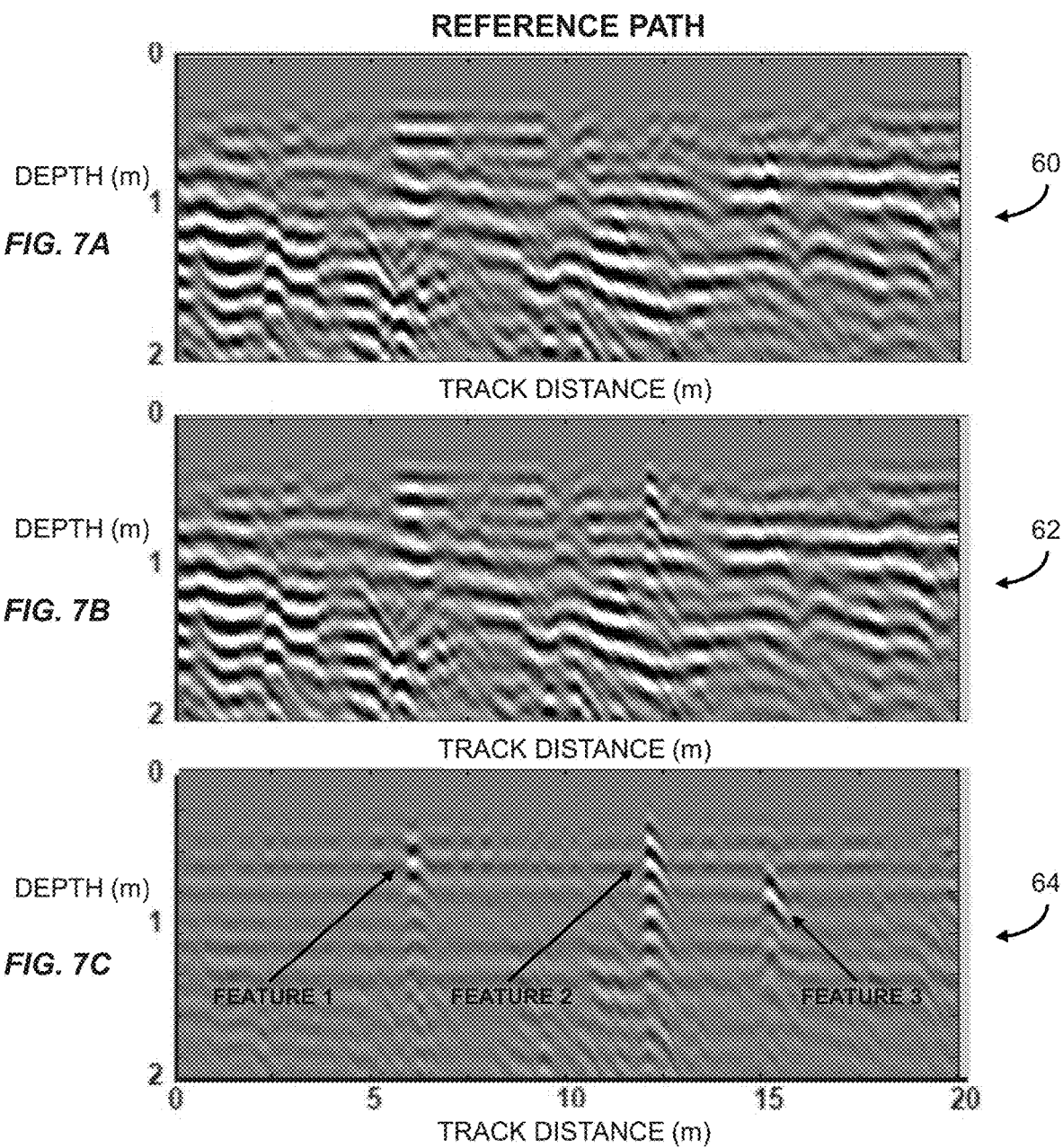
FIG. 7A shows an along-track slice of previously acquired SPR reference images for a trip path.
FIG. 7B shows an along-track slice of SPR images for a vehicle track that is registered to the SPR reference images of FIG. 7A.
FIG. 7C shows a difference image of the two SPR image slices of FIG. 7A and FIG. 7B.

FIGS. 7A and 7B show an along-track slice 60 of previously acquired SPR reference images for a trip path and an along track slice 62 of SPR images for a vehicle track that is registered to the reference path. The reference and registered SPR image slices 60 and 62, respectively, are expected to be substantially identical. FIG. 7C shows a difference image 64 of the two SPR image slices 60 and 62 which indicates features in the subsurface region that developed or were introduced subsequent to acquisition of the SPR data for the reference slice 60. The features may indicate man-made changes such as pipe installations, electrical and drainage channels, and the like. Conversely, features may be due to changes in subsurface conditions that may require repair. Examples of how such features are detected are described, for example, in U.S. Pat. No. 8,786,485, titled "Mobile Coherent Change Detection Ground Penetrating Radar" which is incorporated by reference herein in its entirety. Embodiments of methods for localization of a vehicle described below can be applied to change detection GPR techniques to improve accuracy in the detection of the newly detected features.

Various embodiments described above relate to navigation over road networks and therefore in what generally can be referred to as an outdoor surface environment. Alternatively, a vehicle may be controlled in an indoor environment such as inside a building or within a complex of buildings. The vehicle can navigate hallways, warehouses, manufacturing areas and the like. In other alternatives, a vehicle may be controlled inside structures in regions that may be hazardous to humans, such as in nuclear power facilities and in hospital and research facilities where biohazards may be present. In various embodiments, a SPR is be used to obtain SPR images that include subsurface regions in and/or behind floors, ceilings or walls. Thus, the mobile SPR system can be oriented to transmit radar signals and receive radar signals in a preferred direction.

Another alternative environment is an underground environment which may include, by way of examples, an underground tunnel or mine passageway. Thus, a mining vehicle can be configured with an SPR antenna array configured to transmit and receive in any direction orthogonal to the vehicle direction of travel for which previously acquired SPR reference images are available. Optionally, the mining vehicle can inspect the tunnel or passageway structure for changes or content by determining differences in the SPR images acquired by the vehicle after registration to the corresponding SPR reference images.

Figure 8:
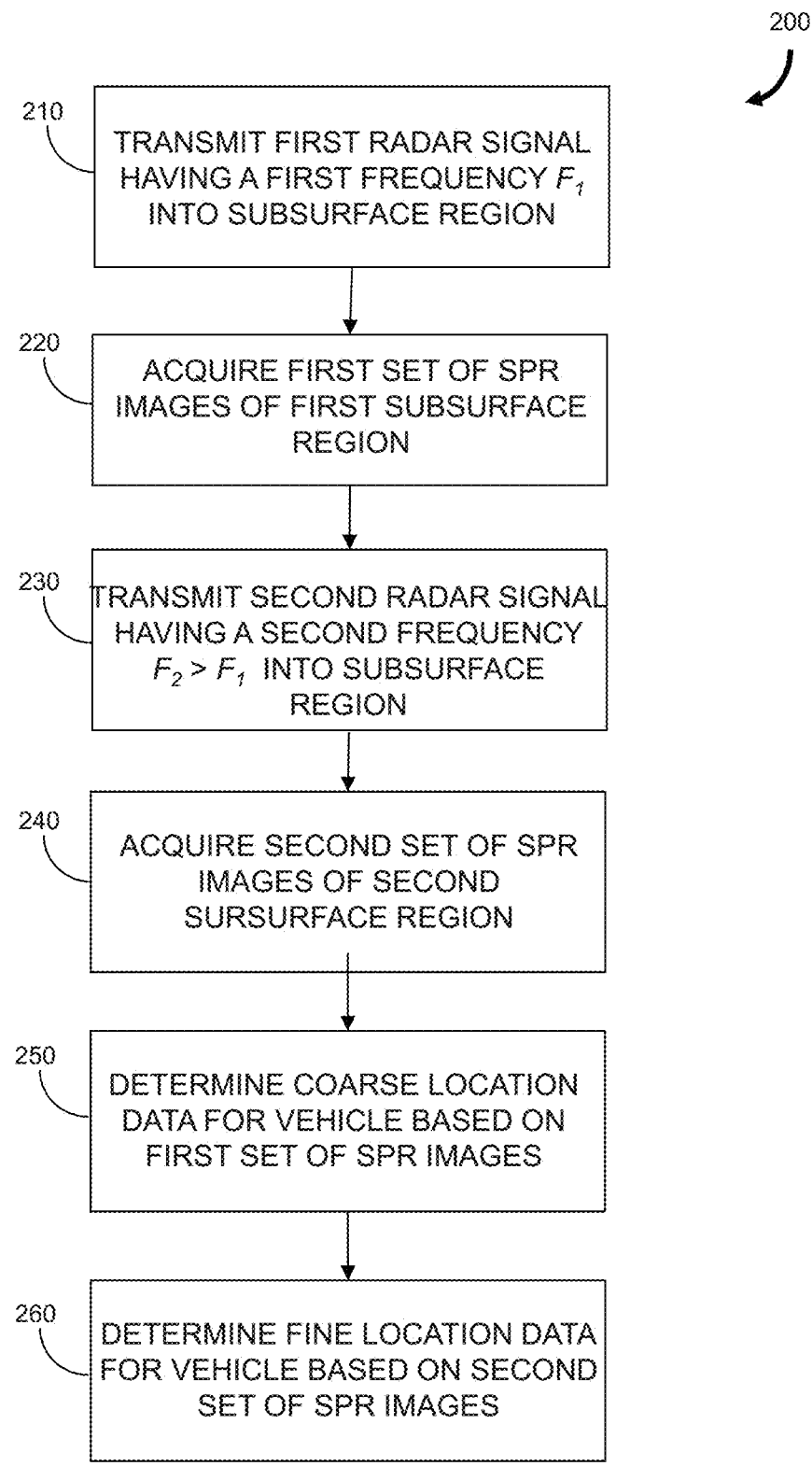
FIG. 8 is a flowchart representation of another embodiment of a method for localization of a vehicle.
Figure 9A:
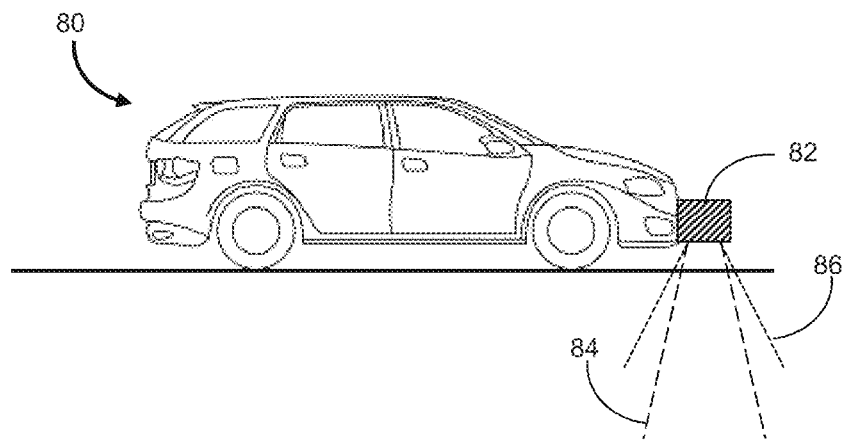
FIG. 9A is a side view of a vehicle showing the transmission of two different radar signals from a transmitter element of a SPR system into a subsurface below the vehicle.
Figure 9B:
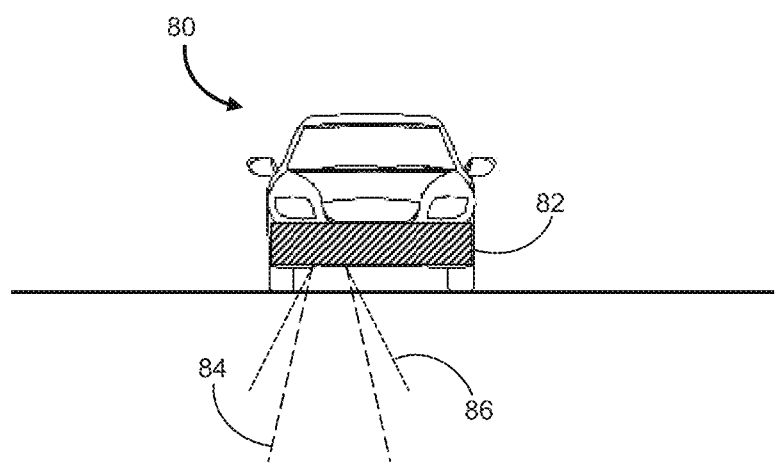
FIG. 9B is a front view of the vehicle shown in FIG. 9A.

Variations on the methods described above can be employed to improve the accuracy and robustness of the vehicle localization. Reference is made to FIG. 8 which shows a flowchart representation of an embodiment of a method 200 for localization of a vehicle and to FIGS. 9A and 9B which show side and front views, respectively, of a vehicle 80 during the transmission of radar signals from a GPR array 82 into a subsurface region below the vehicle 80.

The method 200 includes transmitting (step 210) a first radar signal 84 having a first frequency $F_1$ into the subsurface region and acquiring (step 220) a first set of GPR images for at least a portion of the volume of the subsurface region into which the first radar signal 84 propagates. A second radar signal 86 having a frequency $F_2$ is transmitted (step 230) into the subsurface region and a second set of GPR images is acquired (step 240) for the subsurface volume receiving the second radar signal 86. The frequency $F_2$ is greater than the frequency $F_1$. By way of a non-limiting numerical example, the first frequency $F_1$ may be a frequency in a frequency range extending from about 100 MHz to about 400 MHz and the second frequency $F_2$ may be a frequency in a frequency range extending from about 1 GHz to about 2 GHz. In an alternative numerical example, the first frequency $F_1$ may be the frequency in a frequency range extending from about 100 MHz to about 400 MHz and the second frequency $F_2$ may be a frequency in a frequency range extending from about 200 MHz to about 400 MHz.

Coarse localization data are determined (step 250), for example, using an embodiment of the registration processes described above and more accurate localization data for the vehicle are determined (step 260) based on the second set of GPR images. Due to the difference in frequencies, the first radar signal 84 generally penetrates into the subsurface region to a greater depth than the second radar signal 86; however, the localization data determined based on the first set of GPR images typically has a coarser resolution. In one embodiment, the coarse localization data are determined using lower resolution maps and coarse underground features. This coarse localization data obtained from the first radar signal 84 can be used to reduce the search volume for the localization determination made using the second set of GPR images which serves to increase the robustness and accuracy of the final determined location data. The fine localization data obtained by using the second set of GPR images may be determined using higher resolution maps that may include smaller underground features.

Preferably, the second radar signal 86 is transmitted with minimal delay after transmitting the first radar signal 84. This significantly reduces the distance travelled between the samplings of the ground by the two radar signals and the error that results from the difference in location of the GPR antenna array between the two ground samplings. In one embodiment, the first frequency $F_1$ and the second frequency $F_2$ are transmitted simultaneously.

In alternative embodiments, more than two samplings can be used. For example, a sequence of radar signals of increasing frequency (e.g., a stepped frequency ramp) can be utilized to obtain more accurate localization data.

The frequencies $F_1$ and $F_2$, and any intermediate frequencies or ranges of frequencies, may be selected according to the properties of one or more features anticipated to be present in at least some of the GPR images. For example, frequencies can be selected such that particular depth ranges or feature types, stabilities, clutter levels and features sizes are emphasized or deemphasized in the data. Thus, frequency selection may allow emphasis for features such as traffic light sensors, pipes, layers of road and soil. The frequency $F_1$ may be selected based on the radar reflectivities and dimensions of abundant subsurface features used for coarse localization while the frequency $F_2$ may be selected based on the known presence of smaller subsurface features in the subsurface region penetrated by the second radar signal 86.

The first and second radar signals 84, 86 may be transmitted from the same radar transmitter element although this is not a requirement. For example, different transmitter elements may be used if the search volume for the second radar signal 86 is within the imaged subsurface region for the first radar signal 84.

The transmission of the first and second radar signals 84, 86 into the subsurface results in a first received radar signal and a second received radar signal, respectively, from the subsurface region. The acquisition of the first and second sets of GPR images may include applying a range gate to the first and second received radar signals. The "width" of the range gate may be selected to define the dimensions of the GPR images. For example, the range gate can be selected to define the upper and lower depths for the GPR image. The range gate may be selected to avoid a subsurface region having less stable features, low feature population and/or features known to have changed. Thus, regions having more stable and/or more numerous features are used, resulting in the determination of more accurate localization data.

In one embodiment, each radar signal 84, 86 includes a plurality of frequencies where the frequencies in the first radar signal 84 are less than the frequencies in the second radar signal 86. Alternatively, there may be some overlap of the frequency ranges of the two radar signals 84, 86. For example, some of the highest frequency components of the first radar signal 84 may be at greater frequencies than the lowest frequency components of the second radar signal 86. In another alternative, the frequency range for the second radar signal 86 may include all the frequencies of the first radar signal 84.

In one embodiment, either or both the first and second radar signals 84, 86 may have a frequency that changes in time. For example, a radar signal could include a ramp of discrete frequencies over time. In another embodiment, there may be a single radar signal transmitted that is effectively the simultaneous sum of the first and second radar signals 84, 86 described above and the returned signal from the subsurface region may be independently processed according to frequency content.

In the embodiments of the method 200 described above, two radar signals are used; however, in other embodiments, three or more radar signals may be used. For example, one or more intermediate radar signals may be used in addition to the first and second radar signals 84, 86. Each of the intermediate radar signals may have an intermediate frequency that is greater than the frequency $F_1$ of the first radar signal 84, less than the frequency $F_2$ of the second radar signal 86 and different from the frequencies of the other intermediate radar signals. A set of GPR images is acquired for a corresponding subsurface region for each of the intermediate radar signals and, for each of these sets of GPR images, location data for the vehicle are determined. Thus, there can be a progression through multiple levels of increasing resolution to a final localization determination.

While the invention has been shown and described with reference to specific embodiments, it should be understood by those skilled in the art that various changes in form and detail may be made therein without departing from the scope of the invention.

What is claimed is:

1. A method for localization of a vehicle, the method comprising:
    transmitting a first radar signal having a first frequency into a subsurface region under a vehicle;
    acquiring a first set of surface penetrating radar (SPR) images of a first subsurface region based on the first radar signal;
    determining a first set of location data for the vehicle based on the first set of SPR images;
    transmitting a second radar signal having a second frequency into the subsurface region, the second frequency being greater than the first frequency;
    acquiring a second set of SPR images of a second subsurface region at least partially overlapping the first subsurface region based on the second radar signal; and
    determining a second set of location data for the vehicle based on the first set of location data and based on the second set of SPR images, wherein the second set of location data are at a greater resolution than the first set of location data.

2. The method of claim 1 wherein the first radar signal has a first plurality of frequencies and the second radar signal has a second plurality of frequencies.

3. The method of claim 2 wherein the first and second pluralities of frequencies includes overlap frequencies.

4. The method of claim 1 wherein the first radar signal and/or the second radar signal comprise a ramp of discrete frequencies over time.

5. The method of claim 1 wherein the first radar signal and the second radar signal are transmitted simultaneously.

6. The method of claim 2 wherein the second plurality of frequencies includes all the frequencies of the first plurality of frequencies.

7. The method of claim 2 wherein the first plurality of frequencies includes all the frequencies of the second plurality of frequencies.

8. The method of claim 1 wherein a depth of the second subsurface region is smaller than a depth of the first subsurface region.

9. The method of claim 1 wherein the first radar signal and the second radar signal is a single radar signal that includes the first and second frequencies.

10. The method of claim 1 wherein the first and second radar signals are transmitted from a same radar transmitter element.

11. The method of claim 1 wherein the first and second radar signals are transmitted from different radar transmitter elements.

12. The method of claim 1 further comprising controlling the movement of the vehicle in response to the location data.

13. The method of claim 1 further comprising:
    transmitting into the subsurface region at least one additional radar signal each having a frequency content that is different from the first radar signal, the second radar signal, and each other additional radar signal;
    acquiring an additional set of SPR images for each of the additional radar signals; and
    determining location data for the vehicle based on the additional sets of SPR images.

14. The method of claim 1 further comprising:
    transmitting one or more intermediate radar signals into the subsurface region, each of the intermediate radar signals having an intermediate frequency that is greater than the first frequency and less than the second frequency, and each of the intermediate frequencies being different from each of the other intermediate frequencies;
    for each of the intermediate radar signals, acquiring an intermediate set of SPR images of an intermediate subsurface region; and
    for each intermediate set of SPR images, determining location data for the vehicle based on a corresponding one of the intermediate sets of SPR images.

15. The method of claim 1 wherein the acquiring of the first and second sets of SPR images comprises applying a range gate to a first received radar signal and a second received radar signal, respectively, from the subsurface region.

16. The method of claim 1 wherein at least one of the first frequency and the second frequency are selected based on a property of one or more features in the subsurface region.

17. The method of claim 1 wherein at least one of the first and second sets of SPR images includes SPR images that are weighted according to depth.

18. The method of claim 1 wherein at least one of the first and second sets of SPR images includes SPR images having depths that are excluded.

19. A surface penetrating radar (SPR) system, comprising:
    an SPR antenna array comprising a plurality of antenna elements and configured to transmit a first radar signal having a first frequency and a second radar signal having a second frequency into a subsurface region adjacent to a vehicle, the second frequency being greater than the first frequency, the antenna elements further configured to receive a return radar signal from the sub surface region;
    a radar processor in communication with the SPR antenna array, the radar processor configured to:
        acquire a first set of SPR images of a first subsurface region based on the first radar signal; and
        acquiring a second set of SPR images of a second subsurface region at least partially overlapping the first subsurface region based on the second radar signal; and
    a registration module in communication with the processor, the registration module configured to:
        determine a first set of location data for the vehicle based on the first set of SPR images; and
        determine a second set of location data for the vehicle based on the first set of location data and based on the second set of SPR images, wherein the second set of location data are at a greater resolution than the first set of location data.

20. The SPR system of claim 19 wherein the SPR antenna array is further configured to transmit into the subsurface region at least one additional radar signal each having a frequency content that is different from the first radar signal, the second radar signal, and each other additional radar signal, and wherein the radar processor is further configured to acquire an additional set of SPR images for each of the additional radar signals.

21. The SPR system of claim 20 wherein the registration module is further configured to determine location data for the vehicle based on the additional sets of SPR images and location data previously determined for the vehicle.

22. The SPR system of claim 19 wherein the SPR antenna array is further configured to transmit one or more intermediate radar signals into the subsurface region, each of the intermediate radar signals having an intermediate frequency that is greater than the first frequency and less than the second frequency, and each of the intermediate frequencies being different from each of the other intermediate frequencies, and wherein the radar processor is further configured, for each of the intermediate radar signals, to acquire an intermediate set of SPR images of an intermediate subsurface region.

23. The SPR system of claim 22 wherein the registration module is further configured, for each intermediate set of SPR images, to determine location data for the vehicle based on a corresponding one of the intermediate sets of SPR images and location data previously determined for the vehicle.

* * * * *